United States Patent [19]
Quirijnen et al.

[11] Patent Number: 5,398,417
[45] Date of Patent: Mar. 21, 1995

[54] ELECTRICAL HAND TOOL WITH RECIPROCATING DRIVE

[75] Inventors: Antonius J. J. Quirijnen, Molenschot; Jan P. Houben, Breda, both of Netherlands

[73] Assignee: S-B Power Tool Company, Chicago, Ill.

[21] Appl. No.: 98,523

[22] Filed: Jul. 28, 1993

[30] Foreign Application Priority Data

Jul. 29, 1992 [NL] Netherlands ............ 9201369

[51] Int. Cl.⁶ ................. B23D 51/16; B27B 19/09
[52] U.S. Cl. ............................ 30/394; 30/392; 83/823
[58] Field of Search .............. 83/824, 747, 748, 635, 83/646, 647, 647.5, 823, 825, 827, 828, 829; 30/392, 393, 394, 507, 513

[56] References Cited

U.S. PATENT DOCUMENTS

| | | | |
|---|---|---|---|
| 1,585,543 | 5/1926 | Hörold | 83/823 X |
| 1,725,089 | 8/1929 | Lemmer | 83/823 |
| 3,095,748 | 7/1963 | Stellyes et al. | |
| 3,890,708 | 6/1975 | Bauer | 30/393 |
| 4,248,101 | 2/1981 | Santoro | |
| 4,550,501 | 11/1985 | Moores, Jr. et al. | 30/393 |
| 4,619,170 | 10/1986 | Maier et al. | |
| 4,628,605 | 12/1986 | Clowers | 30/393 |
| 4,879,935 | 11/1989 | Gerber | 83/748 |
| 5,009,012 | 4/1991 | Martinez et al. | 30/394 |
| 5,079,844 | 1/1992 | Palm | 30/393 X |
| 5,170,564 | 12/1992 | Kaiser | 30/393 |
| 5,205,043 | 4/1993 | Batt et al. | 30/393 |

FOREIGN PATENT DOCUMENTS

604127 9/1948 United Kingdom .

*Primary Examiner*—Rinaldi I. Rada
*Attorney, Agent, or Firm*—Jones, Day, Reavis & Pogue

[57] ABSTRACT

The invention relates to an electric hand tool comprising a housing, a reciprocating carrier for an operating member drivable by means of an electric motor placed in the housing, wherein the carrier is guided by at least two guide members fixed in the housing, wherein the guide members each comprise two guides placed on either side of the carrier, wherein one of the guides is fixedly attached and the other guide is provided with means for urging the guide against the carrier.

The occurrence of play, wear, noise nuisance and vibrations is thus avoided.

According to a preferred embodiment, both guides forming part of a guide member are formed by guide rollers received in a frame and the frame is fixedly mounted by means of a shaft extending through one of the guide wheels and a spring is placed between the housing and the frame such that the spring urges the other guide wheel into contact with the carrier.

12 Claims, 1 Drawing Sheet

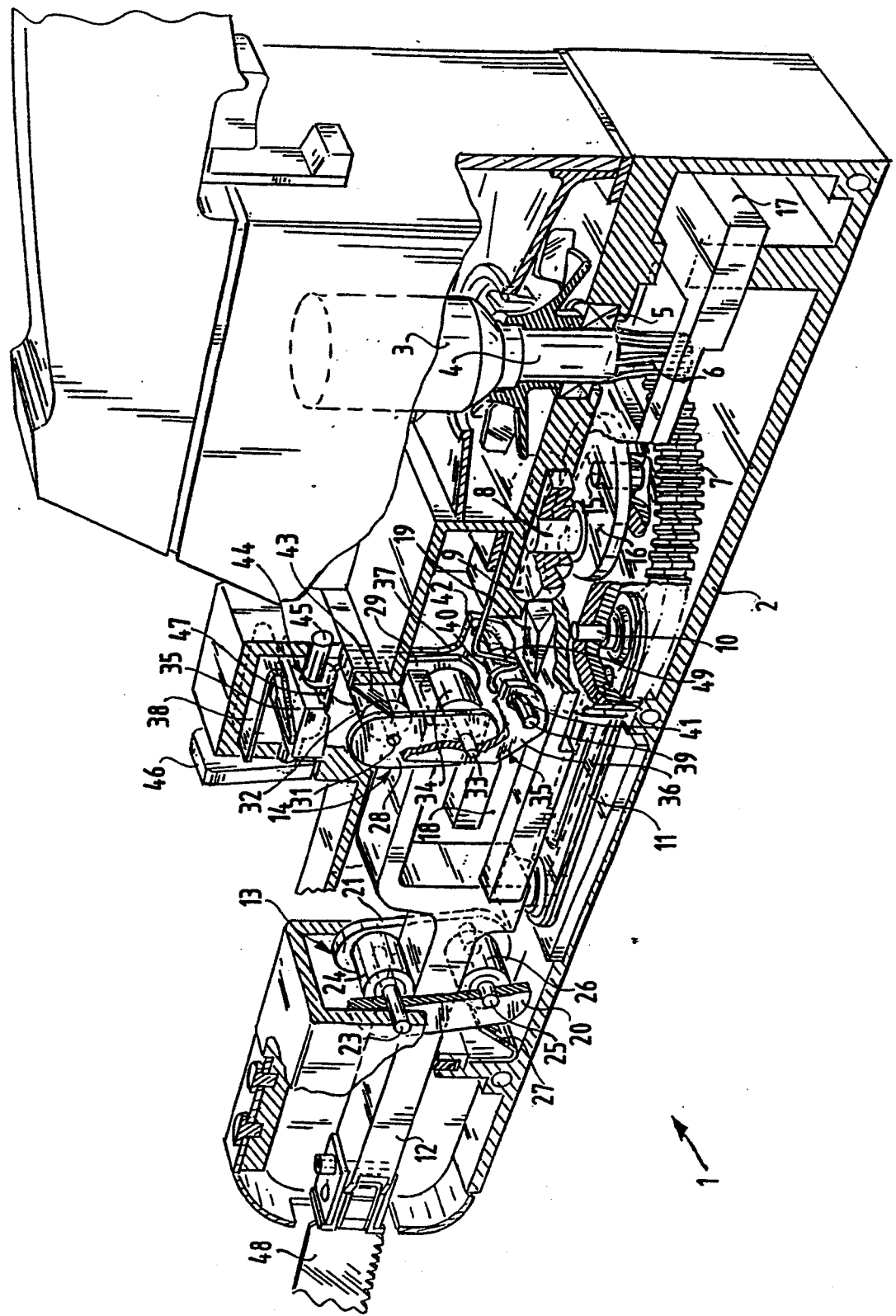

ELECTRICAL HAND TOOL WITH RECIPROCATING DRIVE

The invention relates to an electric hand tool comprising a housing, a reciprocating carrier for an operating member drivable by means of an electric motor placed in the housing, wherein the carrier is guided by at least two guide members fixed in the housing.

Such devices are generally known, for instance in the form of electric saws or files.

The operating member, that is, the saw blade or the file, is attached to a carrier, which carrier forms part of the electric hand tool. The carrier is guided by at least two guide members and driven by means of a crankshaft mechanism.

As a result of the varying loads during use of the electric hand tool, great changes occur in the loads of the guide members. As a consequence, when the latter are embodied rigidly, as known in the prior art, play will occur after a period of use, which stimulates further wear, produces noise nuisance and causes vibrations which are perceived as unpleasant by the user.

The object of the present invention is to provide such an electric hand tool wherein the above stated problems are avoided.

This object is achieved in that the guide members each comprise two guides placed on either side of the carrier, wherein one of the guides is fixedly attached and the other guide is provided with means for urging the guide against the carrier.

According to a preferred embodiment both guides forming part of a guide member are formed by guide rollers received in a frame and the frame is fixedly mounted by means of a shaft extending through one of the guide wheels and a spring is placed between the housing and the frame such that the spring urges the other guide wheel into contact with the carrier.

The present invention will subsequently be elucidated with reference to the annexed FIGURE which shows a partly broken away perspective view of an embodiment of a device according to the invention.

Shown in the FIGURE is an electric saw 1 formed by a housing 2 in which an electric motor is placed whereof the anchor 3 is shown. The motor shaft 4 which is mounted in the housing 2 by means of a bearing 5 is provided with a toothing 6 which is in engagement with a gear wheel 7. The latter is formed by two halves so that it is possible to manufacture each of the gear wheel halves by means of stamping, which considerably limits the production costs.

The gear wheel 7 is mounted about a shaft 8 which is fixed in a disc 9 enclosed in the housing 2. Fixed eccentrically to the gear wheel 7 is a shaft 10 on which a crankshaft 11 is rotatably mounted. The crankshaft 11 is likewise rotatably connected to a carrier 12. The latter is received for movement between two guide members 13 and 14 respectively which will be elucidated hereinafter. Further, a pin 15 is arranged diametrically opposite shaft 10 and likewise in eccentric manner, on which pin a disc-like cam 16 is fixedly attached to the gear wheel 7 concentrically of the pin and extending around the shaft 8. A counter-weight 17 extends around the cam 16. The counter-weight is provided with a recess 18 to provide space for the carrier 12.

An impact ridge 19 is arranged on top of the counter-weight 17.

Both guide members 13, 14 are formed by two flat plates 20, 21 which are mutually joined by means of a long shaft 23, which in addition to extending through the housing also extends through the plates 20, 21, and by a short shaft 25 which only extends through both flat plates 20, 21. Both shafts 23, 25 are fixedly connected to both plates 20, 21. A guide roller 24 is arranged rotatably on the long shaft 23. A roller 26 is arranged rotatably on the short shaft 25.

As a result of this construction, the upper roller 24 is mounted rotatably but fixedly in the housing 2, while the shaft 25 of the lower roller 26 is rotatable on the shaft 23. The carrier 12 extends between both rollers 24, 26. To bring the lower roller 26 into contact with the carrier 12 a spring 27 is arranged between housing 2 and guide member 13.

The construction of the other guide member 14 will now be discussed. Guide member 14 comprises two flat plates 28, 29 connected by a short shaft 31 on which a roller 32 is arranged for rotation; and along shaft 33 on which a roller 34 is arranged for rotation.

The long shaft 33 is mounted on either side in a sub-frame 35 that is formed by a first plate 36 and a second plate 37. The long shaft 33 extends through both plates 36, 37 of the sub-frame. The sub-frame is fixed for reciprocating in its entirety in the direction transversely of the direction of movement of the carrier in the housing 2.

By means of a spring 38 arranged between the upper part of housing 2 and the sub-frame 35 the latter is constrained downward. In the sub-frame between both plates 36, 37 is again arranged a shaft 39 on which a roller 40 is mounted. The shaft 39 herein extends through slots 41, 42 arranged in the plates 36 and 37 respectively. The shaft 39 with the roller 40 fixed thereto is thus movable in the direction defined by the slots 41 respectively 42. A spring 43 is further arranged which exerts a force on the guide member 14 such that the roller 32 is urged into contact with the carrier 12. A spring 49 arranged between the housing 2 and the roller 40 urges the roller to a preferred position located as far downward as possible.

An eccentric 44 is arranged to adjust the stroke of the sub-frame 35. The eccentric 44 is formed by a shaft 45 which extends through the housing 2 and to which is fixed a lever 46. Arranged eccentrically on the shaft 45 is a thickened piece 47 which can be rotated by means of the lever 46. It is thus seen that the rollers 32, 34 engage respective upper and lower planar surfaces of an offset extension of the carrier 12. Again, these parallel planar surfaces are perpendicular to a plane containing the blade 48. It is herewith possible to limit the stroke of the sub-frame 35 on the underside.

The operation of the present device will now be elucidated.

The shaft 4, and therewith the gear wheel 7, is set into rotation by means of the electric motor 3. The carrier 12 is driven by means of the crank mechanism fixed to the gear wheel so that the carrier 12 performs a reciprocating movement. As a result a saw-blade 48 attached to the carrier 12 will likewise perform a reciprocating movement. It is of course possible to arrange another tool instead of a saw-blade, for instance a filing blade.

By means of the disc 16 the counter-weight 17 is driven such that it likewise performs a reciprocating movement. The phase of the reciprocating movement of the counter-weight 17 is opposed to that of the carrier 12 so that vibrations in the direction of the reciprocating movement are eliminated as far as possible.

When the workpiece is used an upward oriented force will generally be absorbed by the saw-blade 48.

To absorb this force the roller 24 is fixedly mounted in housing 2 by means of the shaft 23. The other roller 26 likewise forming part of the first guide member 13 is urged into contact with the carrier 12 by means of the spring 27 so that play is prevented.

As a consequence of the upward directed force absorbed by the saw-blade 48 the roller 34 will have to absorb a downward directed force. The long shaft extending through the roller 34 is mounted in the sub-frame 35 for this purpose. The spring 43 ensures that the roller 32 is urged into contact with the carrier 12 so that play is likewise prevented in the guide member 14.

As previously stated, the sub-frame 35, which essentially determines the position of the roller 34, is mounted in the housing transversely of the main direction of movement of the carrier 12.

In order to provide a "feed" which is particularly important with the application as saw, the impact ridge 19 is arranged on the counter-weight 17. When the impact ridge 19 is moved forward it presses against the roller 40 so that the latter, also as a result of the form of the slots 41 and 42, is pressed upward. That is to say, the sub-frame 35 is mounted for reciprocating movement in a plane substantially perpendicular to the axis of reciprocation of the carrier 12. The horizontal component of the force exerted by the impact ridge prevents the roller 40 being moved upward relative to the sub-frame. The sub-frame is thus moved upward counter to the force of the spring 38. During the return movement of the counter-weight the horizontal component of the force exerted by the other side of the impact ridge will cause the roller to move upward, wherein the shaft 39 moves obliquely upward through the slots 41. Thus the sub-frame then remains at rest, as does the saw-blade.

This movement of the sub-frame provides, as stated above, the feed of the operating member, that is, that at the cam beginning of a work stroke of the operating member the operating member is pressed with force into the workpiece to make the reciprocating movement of the operating member as effective as possible.

The lowest position of the stroke of the sub-frame 35 can be changed by means of the lever 46 so that it is possible to carry the sub-frame to a position such that the protrusion 19 no longer comes into contact with roller 40.

What is claimed is:

1. An electric hand tool comprising, a housing, a reciprocating carrier for an operating member having an elongated, generally rectilinear working edge, said carrier being drivable by means of an electric motor contained in the housing for reciprocating the operating member along a generally rectilinear axis parallel to said working edge, forward and rearward guide assemblies supporting the carrier for generally reciprocal movement, each guide assembly having upper and lower rollers respectively engaging upper and lower planar surfaces of forward and rearward sets of such surfaces formed on the carrier, said planar surfaces being contained in parallel planes which are perpendicular to a plane containing the working edge of the operating member, each guide assembly having one of its rollers mounted for movement to and from the adjacent planar surface of the carrier, each guide assembly including spring means for urging said one roller into engagement with the carrier, and a sub-frame mounted in the tool housing and in turn mounting one of the guide assemblies for reciprocal movement in a plane generally perpendicular to the axis of reciprocation of the operating member.

2. The electric hand tool of claim 1 further defined by, said forward guide assembly having a first shaft fixedly mounted in the tool housing, a pair of plates swingably mounted by said first shaft one on each side of the carrier, a second shaft having its respective opposite ends supported by said plates, said second shaft rotatably supporting said one roller of said forward guide assembly, and a first spring for urging said one roller into engagement with the adjacent planar surface of the carrier, said first shaft mounting the other roller of said forward guide assembly.

3. The electric hand tool according to claim 2 further defined by, said rearward guide assembly having a third shaft supported in said sub-frame, a second pair of plates swingably mounted on said third shaft one on each side of the carrier, a fourth shaft having its respective opposite ends supported by said second pair of plates, said fourth shaft rotatably mounting said one roller of the rearward guide assembly, and second spring means for urging said one roller of the rearward guide assembly into engagement with the adjacent planar surface of the carrier, said third shaft mounting the other roller of said rearward guide assembly.

4. The electric hand tool according to claim 3 wherein said one roller of the forward guide assembly engages the lower planar surface of the forward set of planar surfaces on the carrier and said one roller of the rearward guide assembly engages the upper planar surface of the rearward set of planar surfaces on the carrier.

5. The electric hand tool according to claim 4 further defined by, drive means operated by said electric motor for reciprocating the carrier, cam means mounted in the tool housing for reciprocating movement along a path substantially parallel to the path of reciprocating movement of the carrier, said drive means being connected to said cam means for reciprocating the latter, said sub-frame including cam follower means mounted for engagement by said cam means such that reciprocation of the latter serves to move the sub-frame in at least one direction.

6. The electric hand tool according to claim 5 further defined by resilient means for urging the sub-frame in another direction opposite said one direction.

7. The electric hand tool according to claim 6 further defined by manually operated means for adjusting the stroke of reciprocal movement of said sub-frame.

8. The electric hand tool according to claim 5 further defined by, a counterweight mounted in the tool housing for reciprocal movement along a path substantially parallel with the path of reciprocating movement of the carrier, said drive means being engaged with said counterweight for moving the latter rearwardly when moving the carrier forwardly and for moving the counterweight forwardly when moving the carrier rearwardly, said cam means being mounted on said counterweight.

9. The electric hand tool according to claim 8 further defined by, a cam follower and lost-motion means mounting said cam follower from said sub-frame such that said sub-frame is urged upwardly only upon the forward stroke of said counterweight upon engagement of said cam follower by said cam means.

10. The electric hand tool according to claim 9 wherein said cam follower comprises a roller rotatably mounted on a cam shaft and said lost-motion means is defined by arcuate slots in said sub-frame for receiving and supporting opposite ends of said cam shaft in said slots thereby enabling movement of said opposite ends of said cam shaft in said slots, and resilient means urging said cam shaft toward common ends of the arcuate slots.

11. An electric hand tool comprising, a housing, a reciprocating carrier for an operating member having an elongated, generally rectilinear working edge, said carrier being drivable by means of an electric motor contained in the housing for reciprocating the operating member along a generally rectilinear axis parallel to said working edge, forward and rearward guide assemblies supporting the carrier for generally reciprocal movement, each guide assembly having upper and lower rollers respectively engaging upper and lower planar surfaces of forward and rearward sets of such surfaces on the carrier, said planar surfaces being contained in parallel planes which are perpendicular to a plane containing the working edge of the operating member, each guide assembly including:

(a) a pair of plates one on each side of the carrier;
(b) a first shaft having its respective ends supported by said plates and rotatably supporting one of said upper and lower rollers;
(c) a second shaft mounted in said housing and pivotally supporting said plates, said second shaft also mounting the other of said upper and lower rollers; and spring means for urging said one roller of each of said guide assemblies into engagement with the carrier.

12. The electric hand tool of claim 11 wherein said one roller of the forward guide assembly engages the lower planar surface of the forward set of planar surfaces on the carrier and said one roller of the rearward guide assembly engages the upper planar surface of the rearward set of planar surfaces on the carrier.

* * * * *